US011407336B2

(12) United States Patent
Tibbits et al.

(10) Patent No.: US 11,407,336 B2
(45) Date of Patent: Aug. 9, 2022

(54) STAMPED SPLINED LOCKING MECHANISM FOR ROTATING AUTOMOTIVE SEAT BRACKET

(71) Applicant: Schaeffler Technologies AG & Co. KG, Herzogenaurach (DE)

(72) Inventors: Franklin Tibbits, Clinton Township, MI (US); Christopher Shamie, Brighton, MI (US); Robert Mallon, Birmingham, MI (US); Cameron Gibson, Royal Oak, MI (US); Todd Sturgin, Wooster, OH (US); Chris Luipold, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 548 days.

(21) Appl. No.: 16/420,909

(22) Filed: May 23, 2019

(65) Prior Publication Data
US 2019/0366882 A1 Dec. 5, 2019

Related U.S. Application Data

(60) Provisional application No. 62/680,649, filed on Jun. 5, 2018, provisional application No. 62/680,650, filed on Jun. 5, 2018.

(51) Int. Cl.
*B60N 2/14* (2006.01)
*F16C 33/58* (2006.01)
*F16C 19/10* (2006.01)

(52) U.S. Cl.
CPC .............. *B60N 2/146* (2013.01); *F16C 19/10* (2013.01); *F16C 33/588* (2013.01); *F16C 2326/08* (2013.01)

(58) Field of Classification Search
CPC . B60N 2/146; B60N 2/14; B60N 2/06; B60N 2/16; B60N 2/1685; B60N 2/24; F16C 19/10; F16C 19/02; F16C 19/00; F16C 33/588; F16C 2326/08
USPC ...................................... 297/344.22
See application file for complete search history.

(56) References Cited

U.S. PATENT DOCUMENTS

| | | | | |
|---|---|---|---|---|
| 6,021,989 A | * | 2/2000 | Morita | B60N 2/143 248/349.1 |
| 6,557,919 B2 | | 5/2003 | Suga et al. | |
| 6,722,737 B2 | * | 4/2004 | Kanai | B60N 2/146 248/349.1 |
| 9,085,245 B2 | * | 7/2015 | Haller | B60N 2/0825 |
| 9,180,792 B2 | * | 11/2015 | Haller | B60N 2/509 |
| 9,211,812 B2 | * | 12/2015 | Haller | B60N 2/015 |
| 9,493,242 B2 | * | 11/2016 | Oleson | B60N 2/14 |
| 9,579,995 B2 | | 2/2017 | Haller | |
| 11,208,010 B2 | * | 12/2021 | Haller | B60N 2/146 |
| 11,214,177 B2 | * | 1/2022 | Touzet | B60N 2/14 |

(Continued)

*Primary Examiner* — Mark R Wendell

(57) ABSTRACT

A vehicle seat rotates in response to activation of an electric motor. The electric motor is part of a non-back-drivable mechanism such that it acts to lock the seat in position. The seat mechanism is assembled from stamped components for efficient manufacturing. A bracket includes integrally formed gear teeth which mesh with gear teeth driven by the electric motor. The bracket is held between two stamped parts using four-point angular contact ball bearings. The races of the ball bearings are stamped into the respective stamped parts.

17 Claims, 4 Drawing Sheets

(56) References Cited

U.S. PATENT DOCUMENTS

2013/0161990 A1     6/2013   Oleson
2020/0101871 A1*   4/2020   Garotte ................ B60N 2/0232

* cited by examiner

STAMPED SPLINED LOCKING MECHANISM FOR ROTATING AUTOMOTIVE SEAT BRACKET

CROSS-REFERENCE TO RELATED APPLICATIONS

This application claims priority to U.S. Provisional Applications 62/680,649 and 62/680,650 each filed Jun. 5, 2018, the entire disclosures of which are incorporated by reference herein.

TECHNICAL FIELD

The present disclosure relates generally to a rotating mechanism for a vehicle seat, and more specifically to a mechanism including a stamped spline.

BACKGROUND

In some applications, it may be desirable for a vehicle seat to swivel, for example, 180 degrees. Vehicles, such as vans, may include these seats so that their seating configuration is flexible. When the vehicle is driven, the seat should be locked in a forward-facing direction. Additionally, in the forward-facing position, structural security standards are elevated due to crash-worthiness demands.

SUMMARY

A vehicle seat includes a stamped bracket, a base, and a plurality of rolling elements. The stamped bracket defines a first aperture. Internal gear teeth are integrally formed in the first aperture. The stamped bracket is adapted for fixation to a seat frame. The base is adapted for fixation to vehicle structure. The rolling elements are arranged between the base and the stamped bracket to locate the first aperture with respect to the base and to permit rotation of the stamped bracket with respect to the base about an axis of rotation. The rolling elements may be arranged along two circles, each circle centered on the axis of rotation. The base may include a lower stamping and an upper stamping wherein a portion of the rolling elements are arranged between the lower stamping and the stamped bracket and a remainder of the rolling elements are arranged between the stamped bracket and the upper stamping. A first bearing race may be integrally formed in a top surface of the lower stamping. A second bearing race may be integrally formed in a bottom surface of the stamped bracket. A third bearing race may be integrally formed in a top surface of the stamped bracket. A fourth bearing race may be integrally formed in a bottom surface of the upper stamping. The first through fourth bearing races may be shaped to establish four-point angular contact bearing assemblies. An electric-motor driven actuator may have a shaft with external gear teeth meshing with the internal gear teeth. The shaft may extend through a second aperture defined in the base. The electric-motor driven actuator may be non-back-drivable, thereby locking the seat in position when not electrically powered. J-channels may be stamped into each of the lower stamping and the stamped bracket such that the J-channels interlock when the seat is in a forward-facing position.

A method of manufacturing a vehicle seat includes stamping a bracket, providing a base, and arranging a plurality of rolling elements between the base and the bracket. The bracket defines a first aperture having internal gear teeth integrally formed therein. The bracket is adapted for fixation to a seat frame. The rolling elements locate the first aperture with respect to the base and permit rotation of the bracket with respect to the base about an axis of rotation. Providing the base may include stamping a lower part, stamping an upper part, and fastening the lower part to the upper part after arranging the plurality of rolling elements. Stamping the lower part may include forming a first bearing race in a top surface of the lower part. Stamping the bracket may include forming a second bearing race in a bottom surface of the bracket and forming a third bearing race in a top surface of the bracket. Stamping the upper part may include forming a fourth bearing race in a bottom surface of the upper part. A portion of the rolling elements may be placed between the first and second bearing races and a remainder of the rolling elements may be placed between the third and fourth races. J-channels may be formed into the lower part and the bracket such that they engage each other when the vehicle seat is in a forward-facing position. An electric actuator may be inserted such that a shaft extends through a second aperture formed in the base and external gear teeth fixed to the shaft mesh with the internal gear teeth.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
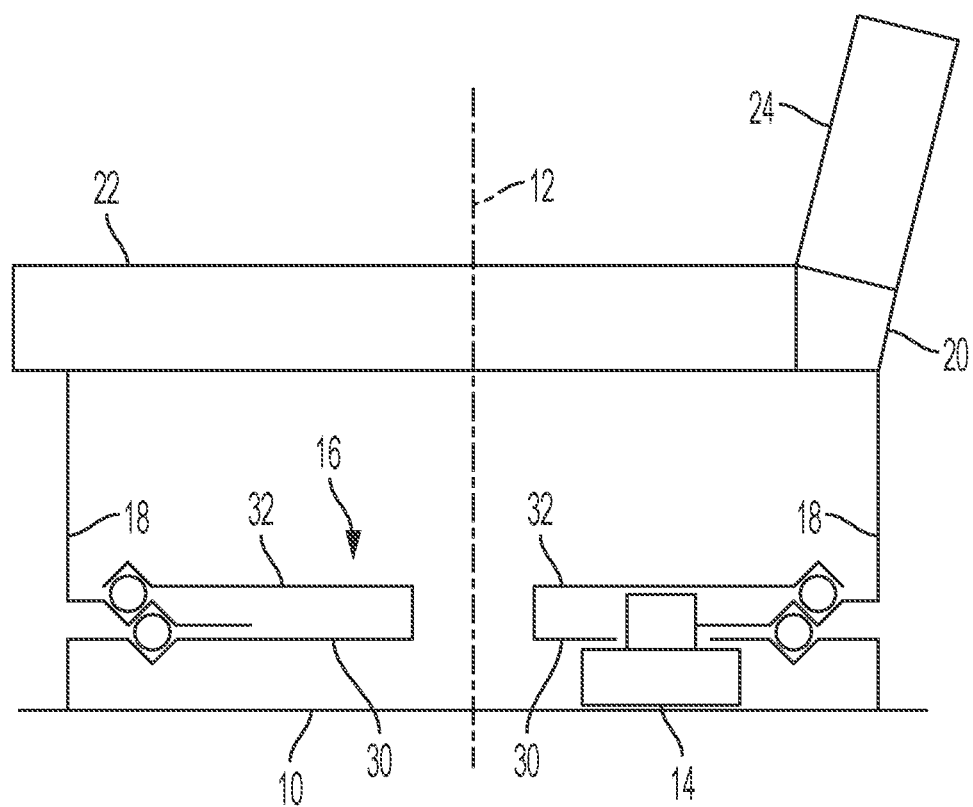
FIG. 1 is a schematic diagram of a rotatable vehicle seat assembly.

FIG. 1 schematically illustrates a motorized swiveling vehicle seat. The seat is attached to vehicle structure such as floorpan 10. The seat swivels about axis 12 in response to operation of an electric motor driven actuator 14. A base assembly 16 is rigidly attached to the vehicle structure. As noted below, base assembly 16 is fabricated from two stampings 30 and 32 which are fastened to one another during assembly of the seat mechanism. A bracket 18 is supported, via bearings, to rotate with respect to the base assembly about the axis 12. The actuator is mounted to vehicle structure and projects through a hole in the base assembly to interface with the bracket to adjust a rotational position of the seat. A seat frame 20 is rigidly fixed to the bracket and supports a seat cushion 22 and a seat back 24.

Figure 2:
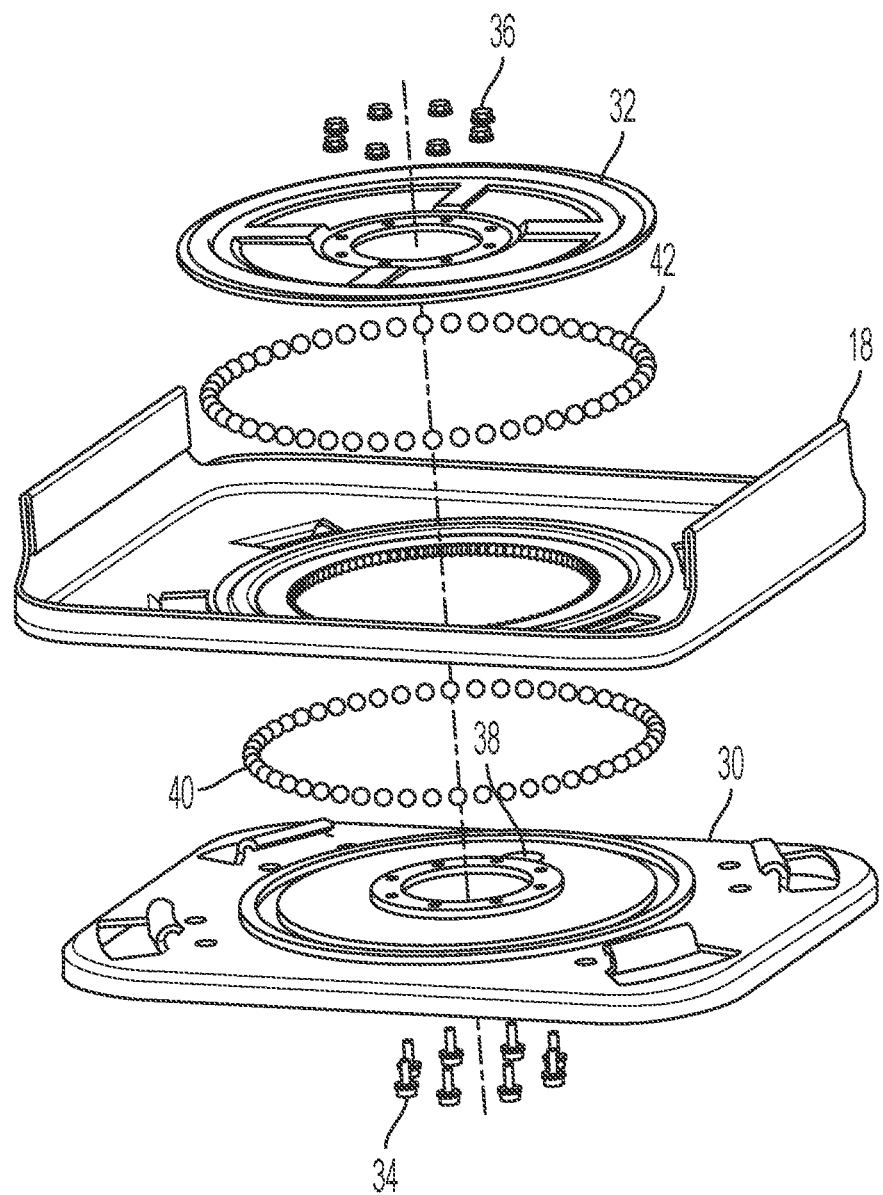
FIG. 2 is an exploded view of the support mechanism of the seat assembly of FIG. 1.

FIG. 2 is an exploded view of the support mechanism, including the base assembly 16 and the bracket 18. Base assembly 16 includes a lower stamping 30 and an upper stamping 32 fastened to one another by bolts 34 and nuts 36. The lower stamping 30 includes a hole 38 through which the actuator projects. The lower stamping 30 is separated from the bracket 18 by a first set of ball bearings 40. The upper stamping 32 is separated from the bracket 18 by a second set of ball bearings 42. The ball bearings are situated along two circles and guided by circular bearing races formed in the lower stamping, bracket, and upper stamping. In cross section, the bearing races are shaped such that each ball contacts each respective race in two positions, thereby forming four-point angular contact ball bearing assemblies. The four-point angular contact bearings may be pre-loaded to resist relative radial movement between the races without play.

Figure 3:
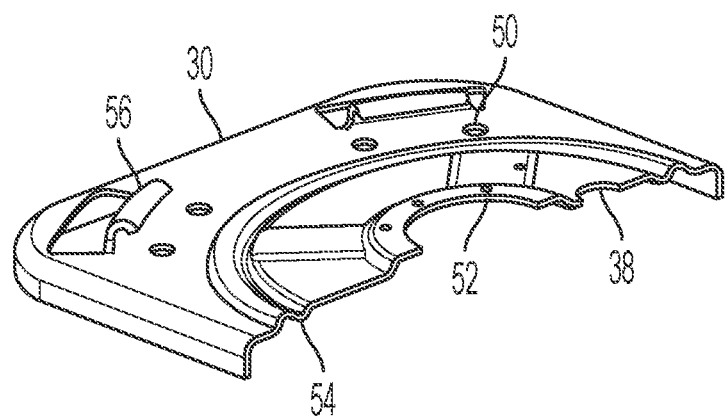
FIG. 3 is a cut-away view of a lower stamping of a base assembly of the support mechanism of FIG. 2.
Figure 4:
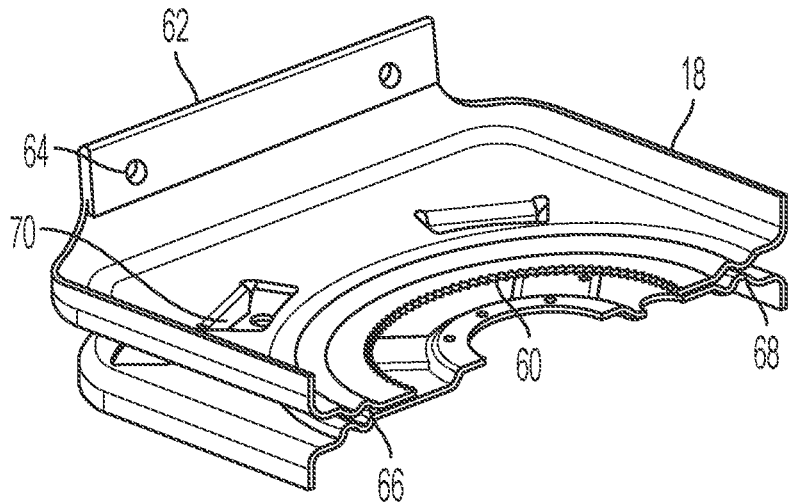
FIG. 4 is a cut-away view of the lower stamping and bracket of the support mechanism of FIG. 2.
Figure 5:
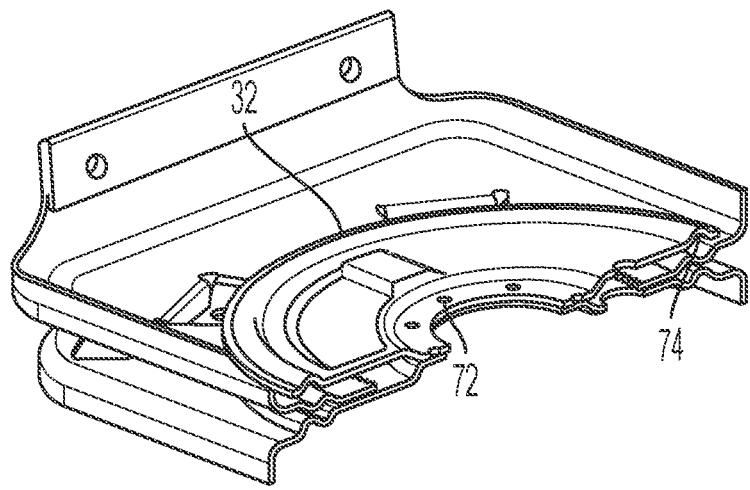
FIG. 5 is a cut-away view of the support mechanism of FIG. 2.

Fabrication and assembly of the support mechanism is illustrated by FIGS. 3-5. FIG. 3 shows lower stamping 30. Lower stamping 30 is formed from flat sheet metal stock by a sequence of stamping operations. Some operations cut the sheet metal stock while other operations bend the metal to a desired shape. Several features of note are formed into lower stamping 30 by the stamping process. A first set of holes 50 are formed which provide for eventual fixation to vehicle structure. A second set of holes 52 are formed which enable eventual bolting to upper stamping 32. As previously mentioned, a hole 38 is formed on one side for actuator 14. A circular groove 54 is formed in the top surface to act as a bearing race for ball bearings 40. Finally, a set of J-channels 56 are formed. As discussed later, these engage with J-channels formed in the bracket to provide greater security when the seat is in the forward-facing position.

FIG. 4 shows the bracket 18 which is also formed by a stamping process. Bracket 18 includes a central opening with internal gear teeth 60. This opening and these gear teeth are integrally formed during the stamping process, reducing cost relative to provision of a separate component formed by conventional gear tooth manufacturing methods. Flanges 62 are formed on front and rear sides of the bracket. Holes 64 in flanges 62 facilitate eventual attachment of the seat frame 20. A circular groove 66 is formed in the bottom surface to act as a bearing race for ball bearings 40. During assembly, ball bearings 40 are placed in groove 54 of the lower stamping and then bracket 18 is positioned such that the balls are in groove 66. Another circular grove 68 is formed in the top surface to act as a bearing race for ball bearings 42.

A set of J-channels 70 are formed in bracket 18. J-channels 70 project downward from bracket 18. Each J-channel 70 includes an outward projecting lip. J-channels 56 project upwards from lower stamping 30 and include an inward projecting lip. When the bracket is aligned with the lower stamping, in the position illustrated in FIG. 4, the J-channels interlock. This resist forces that would pull the bracket upwards or tilt the bracket during a vehicle collision. Preferably, the seat is in this position during driving. In normal operation, the bearings provide sufficient support in any rotational position of the seat. During assembly of bracket 18 to lower stamping 30, bracket 18 is first brought into contact with the bearing in a rotated position and then rotated into the position shown in FIG. 4.

FIG. 5 shows the upper stamping. Holes 72 line up with holes 52. A circular groove 74 is formed in the bottom surface to act as a bearing race for ball bearings 42. During assembly, ball bearings 42 are placed in groove 68 of bracket 18 and then upper stamping 32 is positioned such that the balls are in groove 74. Then, bolts 34 and nuts 36 are installed to complete assembly of the support mechanism. The stamped parts may also include a network of ridges to add stiffness.

Figure 6:
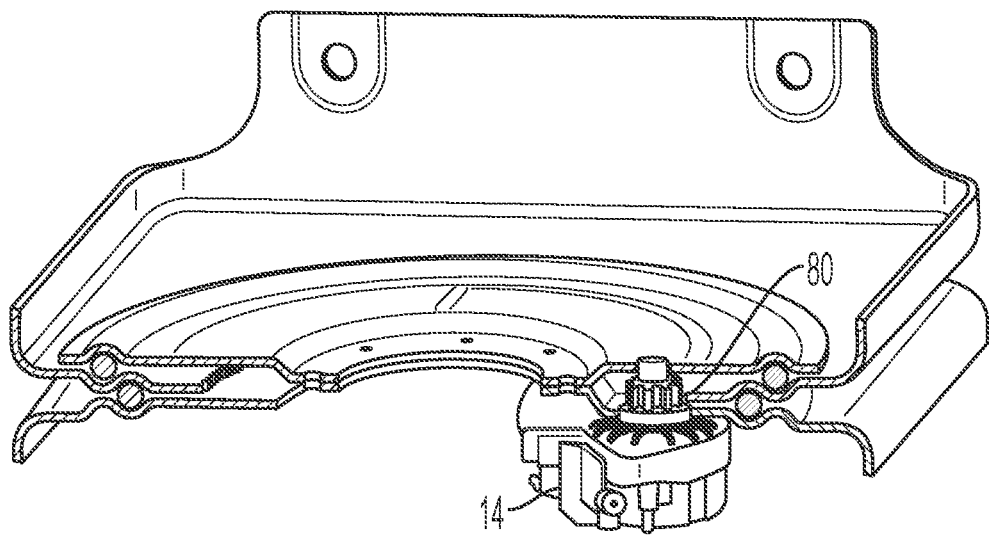
FIG. 6 is a cut-away view of the support mechanism and actuator assembly of the seat mechanism of FIG. 1.

FIG. 6 illustrates the position of the actuator after the support mechanism is installed in the vehicle. An external gear 80 is attached to an electric motor rotor shaft. The external gear teeth of gear 80 mesh with the internal gear teeth 60. When the motor is powered, seat bracket 18 rotates in response. Motor-driven actuator 14 is designed such that it is not back-drivable. In other words, it resists rotation when not electrically powered. Therefore, the actuator acts as a position-lock whenever the motor is not electrically powered.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle seat comprising:
   a stamped bracket defining a first aperture having internal gear teeth integrally formed therein, the stamped bracket adapted for fixation to a seat frame;
   a base adapted for fixation to vehicle structure;
   a plurality of rolling elements arranged between the base and the stamped bracket to locate the first aperture with respect to the base and to permit rotation of the stamped bracket with respect to the base about an axis of rotation; and
   an electric-motor driven actuator having a shaft with external gear teeth, the external gear teeth meshing with the internal gear teeth, the shaft extending through a second aperture defined in the base.

2. The vehicle seat of claim 1 wherein the electric-motor driven actuator is not back-drivable, thereby locking the vehicle seat in position when not electrically powered.

3. The vehicle seat of claim 1 wherein the rolling elements are arranged along two circles, each circle centered on the axis of rotation.

4. The vehicle seat of claim 3 wherein the base comprises a lower stamping and an upper stamping and wherein a portion of the rolling elements are arranged between the lower stamping and the stamped bracket and a remainder of the rolling elements are arranged between the stamped bracket and the upper stamping.

5. The vehicle seat of claim 4 wherein:
a first bearing race is integrally formed in a top surface of the lower stamping;
a second bearing race is integrally formed in a bottom surface of the stamped bracket;
a third bearing race is integrally formed in a top surface of the stamped bracket; and
a fourth bearing race is integrally formed in a bottom surface of the upper stamping.

6. The vehicle seat of claim 5 wherein each of the first through fourth bearing races is shaped to establish four-point angular contact bearing assemblies.

7. The vehicle seat of claim 4 wherein J-channels are stamped into each of the lower stamping and the stamped bracket such that the J-channels interlock when the vehicle seat is in a forward-facing position.

8. A rotatable seat mechanism comprising:
a stamped bracket defining a first aperture having internal gear teeth integrally formed therein, the stamped bracket adapted for fixation to a seat frame;
a base; and
a plurality of rolling elements arranged between the base and the stamped bracket to locate the first aperture with respect to the base and to permit rotation of the stamped bracket with respect to the base about an axis of rotation, wherein:
the base comprises a lower stamping and an upper stamping;
a portion of the rolling elements are arranged between the lower stamping and the stamped bracket and a remainder of the rolling elements are arranged between the stamped bracket and the upper stamping; and
J-channels are stamped into each of the lower stamping and the stamped bracket such that the J-channels interlock when a seat fixed to the stamped bracket is in a forward-facing position.

9. The rotatable seat mechanism of claim 8 further comprising an electric motor having a rotor shaft having external gear teeth, the external gear teeth meshing with the internal gear teeth, the rotor shaft extending through a second aperture defined in the base.

10. The rotatable seat mechanism of claim 8 wherein:
a first bearing race is integrally formed in a top surface of the lower stamping;
a second bearing race is integrally formed in a bottom surface of the stamped bracket;
a third bearing race is integrally formed in a top surface of the stamped bracket; and
a fourth bearing race is integrally formed in a bottom surface of the upper stamping, each of the first through fourth bearing races shaped to establish four-point angular contact bearing assemblies.

11. A rotatable seat mechanism comprising:
a stamped bracket defining a first aperture having internal gear teeth integrally formed therein, the stamped bracket adapted for fixation to a seat frame;
a base comprising a lower stamping; and
a plurality of rolling elements arranged between the base and the stamped bracket to locate the first aperture with respect to the base and to permit rotation of the stamped bracket with respect to the base about an axis of rotation, wherein J-channels are stamped into each of the lower stamping and the stamped bracket such that the J-channels interlock when a seat fixed to the stamped bracket is in a forward-facing position.

12. The rotatable seat mechanism of claim 11 further comprising an electric motor having a rotor shaft having external gear teeth, the external gear teeth meshing with the internal gear teeth, the rotor shaft extending through a second aperture defined in the base.

13. The rotatable seat mechanism of claim 12 wherein:
the electric motor is not back-drivable, thereby locking the stamped bracket in position when not electrically powered.

14. The rotatable seat mechanism of claim 11 wherein the rolling elements are arranged along two circles, each circle centered on the axis of rotation.

15. The rotatable seat mechanism of claim 14 wherein the base comprises an upper stamping and wherein a portion of the rolling elements are arranged between the lower stamping and the stamped bracket and a remainder of the rolling elements are arranged between the stamped bracket and the upper stamping.

16. The rotatable seat mechanism of claim 15 wherein:
a first bearing race is integrally formed in a top surface of the lower stamping;
a second bearing race is integrally formed in a bottom surface of the stamped bracket;
a third bearing race is integrally formed in a top surface of the stamped bracket; and
a fourth bearing race is integrally formed in a bottom surface of the upper stamping.

17. The rotatable seat mechanism of claim 16 wherein each of the first through fourth bearing races is shaped to establish four-point angular contact bearing assemblies.

* * * * *